M. J. GREUBEL.
EXPANSION BOLT.
APPLICATION FILED NOV. 3, 1917.

1,295,734. Patented Feb. 25, 1919.

Inventor
MICHAEL J. GREUBEL

Witness
By Victor J. Evans
Attorney

UNITED STATES PATENT OFFICE.

MICHAEL J. GREUBEL, OF HOBOKEN, NEW JERSEY, ASSIGNOR TO GARWOOD COMPANY, A CORPORATION OF NEW JERSEY.

EXPANSION-BOLT.

1,295,734.  Specification of Letters Patent.  Patented Feb. 25, 1919.

Application filed November 3, 1917. Serial No. 200,114.

*To all whom it may concern:*

Be it known that I, MICHAEL J. GREUBEL, a citizen of the United States, residing at Hoboken, in the county of Hudson and State of New Jersey, have invented new and useful Improvements in Expansion-Bolts, of which the following is a specification.

This invention relates to expansion bolts to be especially used in connection with hollow tile, plaster concrete or brick walls and has for its principal object, the provision of a bolt of this type which may be inserted within an opening drilled into the wall and afterward expanded to retain the same in position.

Another object of the invention is the provision of an expansion member associated with a bolt and nut whereby the nut is retained in position upon the expansion member in order to allow the removal of the bolt from the nut after the member has been expanded.

Another object of the invention is the provision of a device of the character described which is of simple construction, inexpensive to produce and which is efficient for the purpose for which it is intended.

With these and other objects in view, the invention resides in the novel construction, combination and arrangement of parts fully described and pointed out in the following description and claims and illustrated in the accompanying drawings, in which:—

Figure 1:
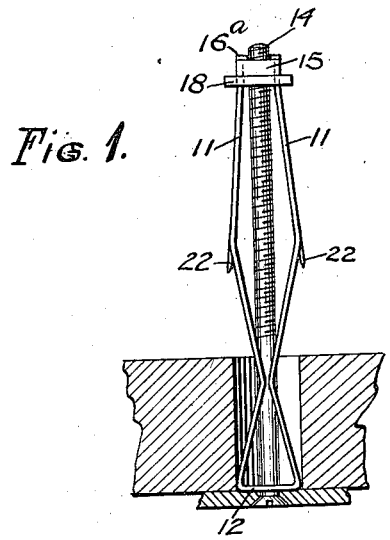
Figure 1 is a sectional view through a wall, showing the device arranged in place before the expansion member has been expanded.
Figure 2:
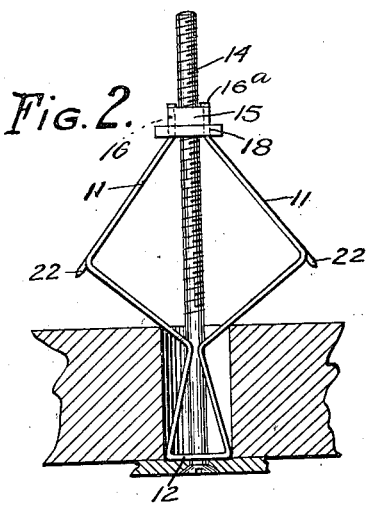
Fig. 2 is a similar view showing the same locked in position.
Figure 3:
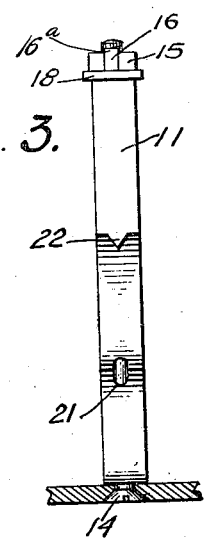
Fig. 3 is a side view of the same.
Figure 4:
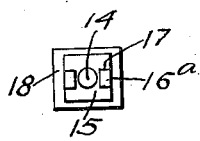
Fig. 4 is an end view.
Figure 6:
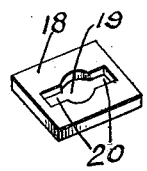
Fig. 6, is a detail perspective view of the locking plate.
Figure 5:
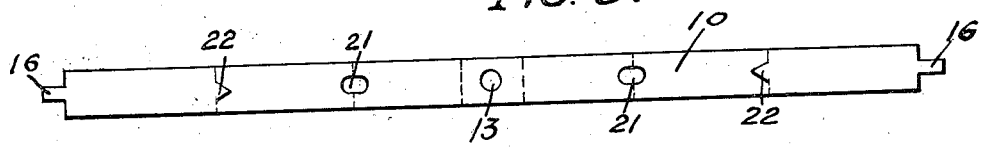
Fig. 5 is a detail view of the blank from which the expansible member is formed.

Referring to the drawings by characters of reference, 10, designates a strip of metal bent upon itself to form the side arms 11, and a connecting portion 12, which is provided with a centrally arranged opening 13, for the reception of a bolt 14, the same being threaded for the reception of a nut 15. The arms 11, are provided at their free extremities with the reduced extensions 16, which are adapted to engage with the notches 17, provided in the side faces of the nut 15, whereby the same is locked against rotation when the bolt is operated to expand the arms. The extensions 16, are bent over as shown at 16ª, to prevent displacement of the nut when the bolt is removed therefrom. 18, represents a locking plate which is provided with an opening 19, having side branches 20. This plate is adapted to receive the extensions 16, and co-act with the same to hold them in engagement with the notches 17, of the nut. The side arms are preferably weakened at the points 21 and 22, the former also being adapted to form a clearance space for the bolt, while the latter comprises a V shaped slit which extends outwardly to form points which will embed themselves into the slot wall. It will be noted from the construction, that after the arms have been expanded, the bolt may be removed from the nut and replaced therein at any time.

In my expansion bolt the strip 10 has the connecting portion 12 of substantially the diameter of the hole in which the bolt is to be mounted. This serves to center the bolt 14. The two arms 11, 11 have portions which approach each other and fulcrum on the bolt 14, permitting the other portion of the arms to be bent so as to throw the strains substantially on the rear of the wall rather than within the wall itself. With a comparatively small opening in the wall I am enabled to get a very powerful hold, and one which will not mar the wall.

From the foregoing description, taken in connection with the drawings, it will be seen that I have shown and provided a simple and preferred form of the invention, but I wish to have it understood that I reserve the right to make such changes and alterations as fall within the scope of the appended claims.

What is claimed as new is:—

1. An expansion device, comprising, an expansible member formed of a strip of material provided with relatively separable connected sections, an adjusting device extending axially of the member between the sctions thereof, each section having angularly disposed branches provided with openings at the vertex of said branches to weaken the member at said vertex for the purpose of augmenting a flexing of the branches on operation of the adjusting device, certain of said openings serve to accommodate the adjusting device therein and means between the adjusting device and said member for maintaining an operative relation of the parts, and a nut coacting with said adjusting device.

2. An expansion device, comprising, an expansible member formed from a strip of metal bent upon itself to provide side arms and a connecting portion therefor, a central opening therein, a bolt extending through the opening and having a nut engaged thereon, gripping portions formed on the free extremities of the arms and engaged with the nut and means for holding the said gripping portions in engagement with said nut.

3. An expansion device, comprising, an expansion member having side arms, connected together at one of their ends and provided with gripping portions on their other ends, a central opening through said member at the point of connection of the arms, a bolt extending therethrough, a nut threaded through and adapted to be engaged by the gripping portions and means for retaining the same in engagement with the nut.

4. An expansion device comprising a bolt, a strip of material bent on itself to form side arms, said arms having portions adapted to fulcrum on said bolt, and means connecting the bolt to the ends of the arms, to expand the arms on operating the bolt.

5. An expansion device comprising a strip of material bent on itself to form side arms, and a connecting centering portion, a bolt, said side arms having portions adapted to fulcrum on said bolt, and means connecting the bolt to the ends of the arms, to expand the arms on operating the bolt.

In testimony whereof I affix my signature.

MICHAEL J. GREUBEL.